Patented July 11, 1933

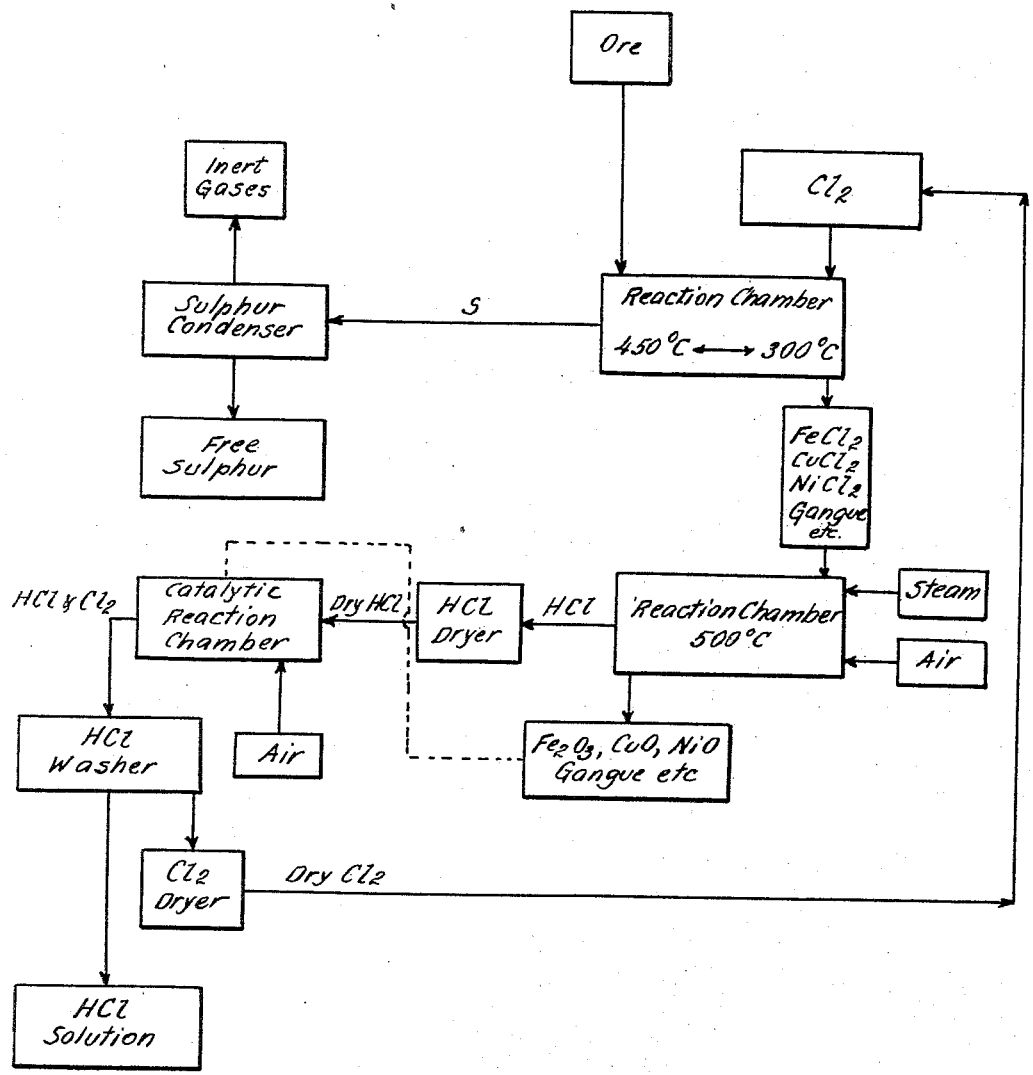

1,917,788

UNITED STATES PATENT OFFICE

RAYMOND F. BACON, OF BRONXVILLE, AND ROCCO FANELLI, OF NEW ROCHELLE, NEW YORK; SAID FANELLI ASSIGNOR TO SAID BACON

RECOVERY OF SULPHUR

Application filed February 25, 1930. Serial No. 431,133.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores, such, for example, as ore containing sulphides of iron, copper and nickel.

The process of the present invention involves the treatment of ore or other metallurgical raw materials or products containing pyrites or other sulphides of iron, alone or in combination with sulphides of other heavy metals, such, for example, as copper and nickel with chlorine for the purpose of obtaining free sulphur and/or separating iron from the mass of material undergoing treatment.

In carrying out a process in accordance with the present invention, a quantity of the material to be treated is subjected to the action of chlorine under such conditions that ferrous chloride and free sulphur are formed. The process is so conducted that the sulphur produced is vaporized, leaving a residue containing the ferrous chloride together with chlorides of other heavy metals such as copper and nickel when the sulphides of such metals are present in the material being treated. The residue containing ferrous chloride is subjected to the action of air and steam to produce hydrogen chloride. The hydrogen chloride produced is dried and subjected to the action of air in the presence of a suitable catalyst to produce free chlorine which is returned to the process.

The invention will be better understood from a consideration of the accompanying flowsheet and the following description of the application of the process to the treatment of ore containing sulphides of copper, nickel and iron.

The ore to be treated is subjected to the action of chlorine under such conditions that ferrous chloride and free sulphur are produced. The operation is so conducted that the sulphur produced is vaporized, leaving a residue containing the ferrous chloride together with the chlorides of copper and nickel. The sulphur may be swept from the reaction chamber by means of inert gases introduced with the chlorine or a temperature sufficiently high to vaporize the sulphur may be maintained and substantially pure chlorine may be employed. Chlorine which is recovered during a subsequent stage of the process may be employed for treating the sulphide-bearing material. The chlorine recovered is mixed with inert gases. When the mixture of gases is employed the chlorinating operation may be conducted at a temperature below the boiling point of sulphur, the inert gases serving to sweep the sulphur from the reaction chamber. The mixture of gases may be employed to aid in vaporizing the sulphur when the reaction chamber is maintained at a temperature above the boiling point of sulphur.

The ore is preferably introduced in a dry, finely divided condition into the interior of a rotary reaction chamber having ore charging means at one end and discharging means at the other end, and which is so constructed and operated that the ore is gradually moved from the charging end toward the discharge end. Chlorine is introduced into the reaction chamber at the end opposite to that at which the ore is introduced and the ore and chlorine pass through the reaction chamber in counter-current relationship. The ore is preferably ground to provide particles sufficiently small to pass a 100-mesh screen in order that intimate contact of the chlorine with the sulphide particles may be obtained.

The process is preferably so controlled that a temperature of about 450° C. is maintained near the charging end of the reaction chamber, and a temperature of about 300° C. to 350° C. is maintained near the discharge end of the reaction chamber. The chlorine in any desired concentration and at any desired temperature is introduced into a portion of the reaction chamber which is maintained at a temperature of about 300° C. to 350° C. The chlorine and the metal sulphides react to produce elemental sulphur, ferrous chloride and the chlorides of copper and nickel. The admission of ore and chlorine is preferably so regulated that all of the sulphur liberated is vaporized as elemental sulphur, all of the chlorine admitted is consumed, and substantially all of the iron sulphide is converted to ferrous chloride.

Any ferric chloride which is produced in the reaction chamber will be vaporized and swept along with the incoming chlorine to meet the entering iron sulphide-bearing-material. The ferric chloride will react with the sulphides to form ferrous chloride and sulphur chloride. Sulphur chloride which is formed will also react with the heavy metal sulphides. The reaction between the sulphides and the chlorine is exothermic and the desired temperatures may be maintained by the heat developed.

The sulphur produced is vaporized and separated from the heavy metal chlorides in the hottest portion of the reaction chamber, and the residue containing the heavy metal chlorides is discharged from the reaction chamber at a temperature of about 300° C. to 350° C.

The hot residue containing ferrous chloride and the chlorides of nickel and copper is treated with steam in order to produce hydrogen chloride and oxides of the metals by hydrolysis. Air is admitted with the steam in order to assist the reaction by oxidation of the iron. The air and steam are preheated in order to assist in maintaining the mass at the desired reaction temperature.

The hydrolysis will take place at normal atmospheric temperatures, but the rate of reaction is too slow for practical purposes. Higher temperatures not only increase the speed of the hydrolysis but also assist in the air oxidation which takes place. The treatment of the ferrous chloride-bearing material with air and steam may be carried out satisfactorily at a temperature of from 440° C. to 600° C. Ordinarily, a reaction temperature of about 500° C. is entirely satisfactory.

The treatment of the ferrous chloride-bearing material with air and steam may be carried out conveniently in a rotary reaction chamber having charging means at one end and discharging means at the opposite end and which is so constructed and arranged that the material passes from the charging end to the discharge end during its rotation. The ferrous chloride-bearing material and the air and steam are introduced into the reaction chamber at the charging end and the resulting heavy metal oxides and hydrogen chloride are removed from the reaction chamber at the discharge end. The oxides and hydrogen chloride are preferably removed through separate discharge outlets. If the hydrogen chloride gas leaving the chamber carries considerable amounts of entrained particles of oxides it may be desirable to provide a settling chamber into which the oxides and hydrogen chloride may be introduced from the reaction chamber. Such a chamber should be maintained at a sufficiently high temperature to prevent the reverse reaction.

Means such, for example, as porcelain balls or other large pieces of inert materials are provided within the reaction chamber to prevent the chlorides from adhering to the walls of the chamber. Such means aid in stirring and grinding the chlorides and oxides as they pass through the reaction chamber.

The gases issuing from the reaction chamber contain hydrogen chloride and water vapor and they are passed through a suitable drying apparatus such, for example, as a packed tower having sulphuric acid trickling therethrough to separate the water vapor and produce dry hydrogen chloride.

The dry hydrogen chloride is introduced into a catalytic reaction chamber with one to seven times its volume of air, depending on the concentration of the hydrogen chloride available. The air is preheated to a temperature above 420° C. and preferably to a temperature between 520 and 530° C. If desired, the hydrogen chloride may also be preheated.

The catalytic reaction chamber preferably consists of a tower, or a series of communicating towers packed with a material having a very large surface per unit of volume such, for example, as pumice, brick, cinders and the like. The packing material should be of such a nature that it will be inert to the reagents and the products of the reaction. The packing material is covered or impregnated with the catalyst which may be one or more chlorides or sulphates of metals such, for example, as copper and nickel. The salts may be applied as such directly to the packing material or they may be formed in place as, for example, by the action of hydrogen chloride on copper oxide which is distributed throughout the mass. Means are provided for renewing the catalytic mass as its efficiency becomes reduced. For this purpose two towers or two series of communicating towers which may be used alternately are preferably provided.

A portion of the mass of oxides resulting from the treatment of the ferrous chloride-bearing material with steam and air may be utilized as a catalytic agent for promoting the reaction between the hydrogen chloride and oxygen.

The apparatus is preferably so constructed that the mass of catalyst-bearing material may be maintained at a temperature of from 370° C. to 400° C. The reaction between the hydrogen chloride and the oxygen of the air is exothermic and it may be so controlled as to permit the proper temperature to be maintained. The reaction will proceed at temperatures as low as 205° C., and temperature as high as 470° C. may be used advantageously. The temperature at which the reaction is conducted will be governed largely by the nature of the catalyst. The temperature employed should be sufficiently low that excessive volatilization of the catalyst is avoided. The reaction involved in this operation does not proceed to completion. The gases issuing from the reaction chamber will consist of a mixture of hydrogen chloride, water vapor and chlorine.

In view of the fact that the reaction does not readily proceed to completion, it may be desirable to retreat the issuing gases by subjecting them to a drying operation to remove the water vapor and subsequently passing them through a second reaction chamber. This procedure may be repeated two or three or more times if desired. In carrying out the reaction between hydrogen chloride and the oxygen of air it is advisable to carefully control the proportions of air and hydrogen chloride utilized in order to avoid excessive dilution of the resulting chlorine gas.

The gases containing hydrogen chloride and chlorine are washed with water to separate the chlorine and hydrogen chloride. The resulting solution of hydrogen chloride in water may be treated in any suitable manner to recover the hydrogen chloride. The chlorine recovered is dried and utilized for treating additional iron sulphide-bearing material.

The process may be conducted continuously. A source of supply of fresh chlorine is provided to compensate for chlorine losses due to leakage and other causes. The fresh chlorine may be supplied as free chlorine or hydrogen chloride, and the choice will depend upon the relative costs.

We claim:

1. The method of treating iron sulphide-bearing material containing sulphides of one or more other heavy metals which comprises subjecting the material to the action of chlorine under such conditions that elemental sulphur and a dry, substantially non-fused product containing ferrous chloride and chlorides of such other heavy metals as may be present in the material are formed and the sulphur is vaporized, subjecting the combined chloride product directly to the action of air and steam to produce simultaneously hydrogen chloride and oxides of the heavy metals, treating the hydrogen chloride to recover chlorine, and returning the chlorine thus recovered to the process.

2. The method of treating iron sulphide-bearing material containing sulphides of one or more other heavy metals which comprises subjecting the material to the action of chlorine under such conditions that elemental sulphur and a dry, substantially non-fused product containing ferrous chloride and chlorides of such other heavy metals as may be present in the material are formed and the sulphur is vaporized, subjecting the combined chloride product directly to the action of air and steam to produce simultaneously hydrogen chloride and oxides of the heavy metals, subjecting the hydrogen chloride to the action of air in the presence of a catalyst to recover chlorine, and returning the chlorine thus recovered to the process.

3. The method of treating iron sulphide-bearing material containing sulphides of one or more other heavy metals which comprises subjecting the material to the action of chlorine under such conditions that elemental sulphur and a dry, substantially non-fused product containing ferrous chloride and chlorides of such other heavy metals as may be present in the material are formed and the sulphur is vaporized, subjecting the combined chloride product directly to the action of air and steam at a temperature of about 440° C. to 600° C. to produce simultaneously hydrogen chloride and oxides of heavy metals, treating the hydrogen chloride to recover chlorine, and returning the chlorine thus recovered to the process.

4. The method of treating iron sulphide-bearing material containing sulphides of one or more other heavy metals which comprises subjecting the material to the action of chlorine under such conditions that elemental sulphur and a dry, substantially non-fused product containing ferrous chloride and chlorides of such other heavy metals as may be present in the material are formed and the sulphur is vaporized, subjecting the combined chloride product directly to the action of air and steam at a temperature of about 440° C. to 600° C. to produce simultaneously hydrogen chloride and oxides of the heavy metals, subjecting the hydrogen chloride to the action of air in the presence of a catalyst to recover chlorine, and returning the chlorine thus recovered to the process.

In testimony whereof we affix our signatures.

RAYMOND F. BACON.
ROCCO FANELLI.